United States Patent
Gillespie et al.

(10) Patent No.: US 8,210,436 B2
(45) Date of Patent: Jul. 3, 2012

(54) AUTOMATIC VIDEO IMAGE REVERSAL OF DIFFICULT TO READ SYMBOLS

(75) Inventors: Malcolm John Gillespie, Marcellus, NY (US); Willis B. Field, Weedsport, NY (US); Henri Jozef Maria Barten, Lommel (BE); Daniel Alfons Pluijms, Eindhoven (NL); Eric Michael Lawson, Auburn, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 555 days.

(21) Appl. No.: 12/082,381

(22) Filed: Apr. 10, 2008

(65) Prior Publication Data

US 2009/0255994 A1    Oct. 15, 2009

(51) Int. Cl.
*G06K 19/06* (2006.01)
(52) U.S. Cl. .................... 235/462.06; 235/455; 235/494
(58) Field of Classification Search .............. 235/462.06
See application file for complete search history.

(56) References Cited

U.S. PATENT DOCUMENTS

| | | | | |
|---|---|---|---|---|
| 4,656,345 A | * | 4/1987 | Kurimoto | 235/462.25 |
| 4,707,120 A | * | 11/1987 | Yamamoto | 355/38 |
| 6,234,396 B1 | * | 5/2001 | Tawara | 235/472.01 |
| 6,832,725 B2 | | 12/2004 | Gardiner et al. | |
| 7,161,655 B2 | * | 1/2007 | Koike | 355/40 |

* cited by examiner

*Primary Examiner* — Thien M. Le
*Assistant Examiner* — Christle Marshall
(74) *Attorney, Agent, or Firm* — Hiscock & Barclay, LLP

(57) ABSTRACT

A method of operating a bar code scanning system adapted for assembling information bearing indicia (IBI) information from partial scans of IBI data which may comprise some undecodable characters, the method comprising the steps of: converting light reflected from a target into output signals representative thereof utilizing an image sensor; illuminating the target utilizing an illumination source; directing light from the target to the image sensor array utilizing receive optics; determining if information contained in IBI within the target derived from the output signals is not decodable; transmitting an image of the IBI to a host processor if the IBI is not decoded.

16 Claims, 7 Drawing Sheets

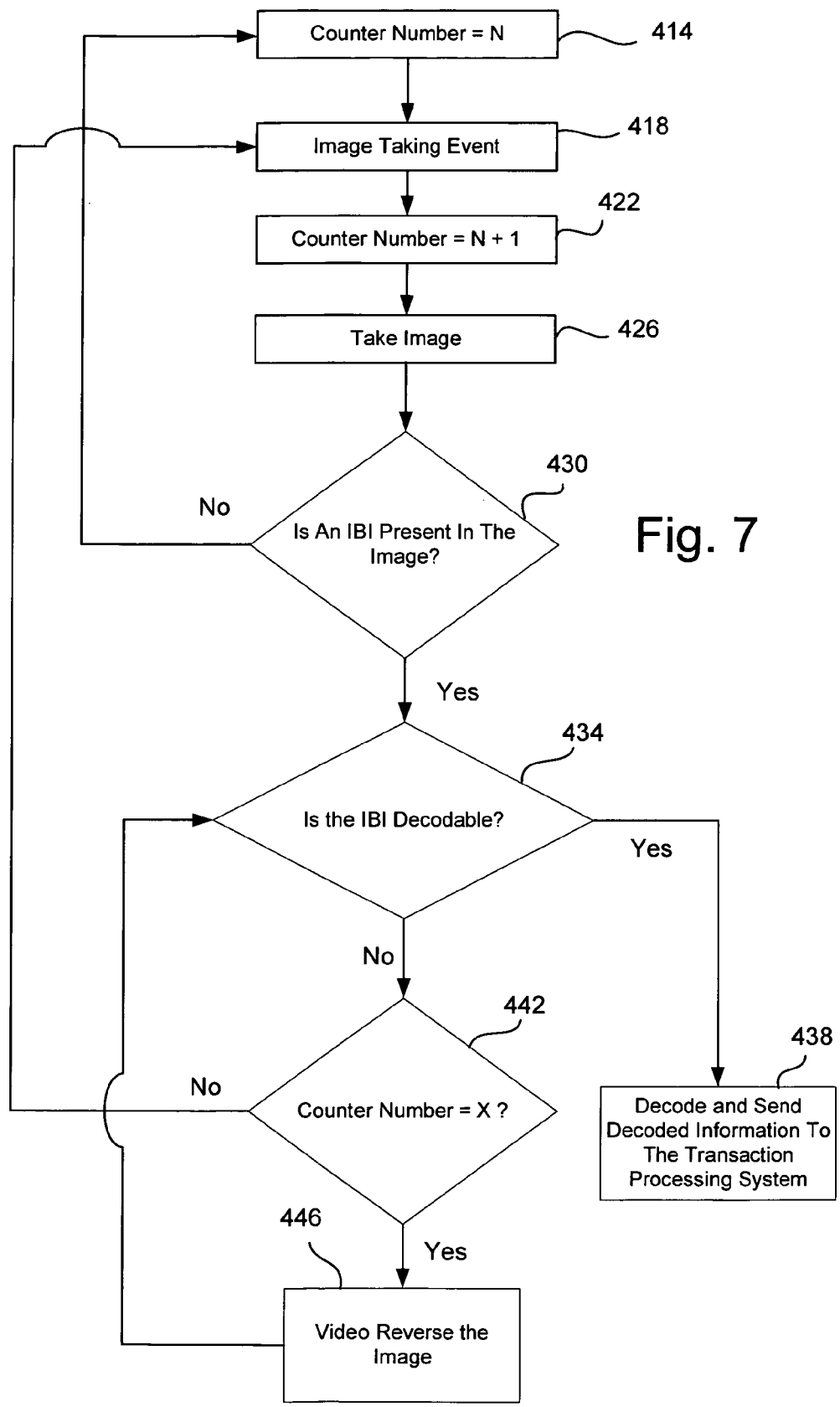

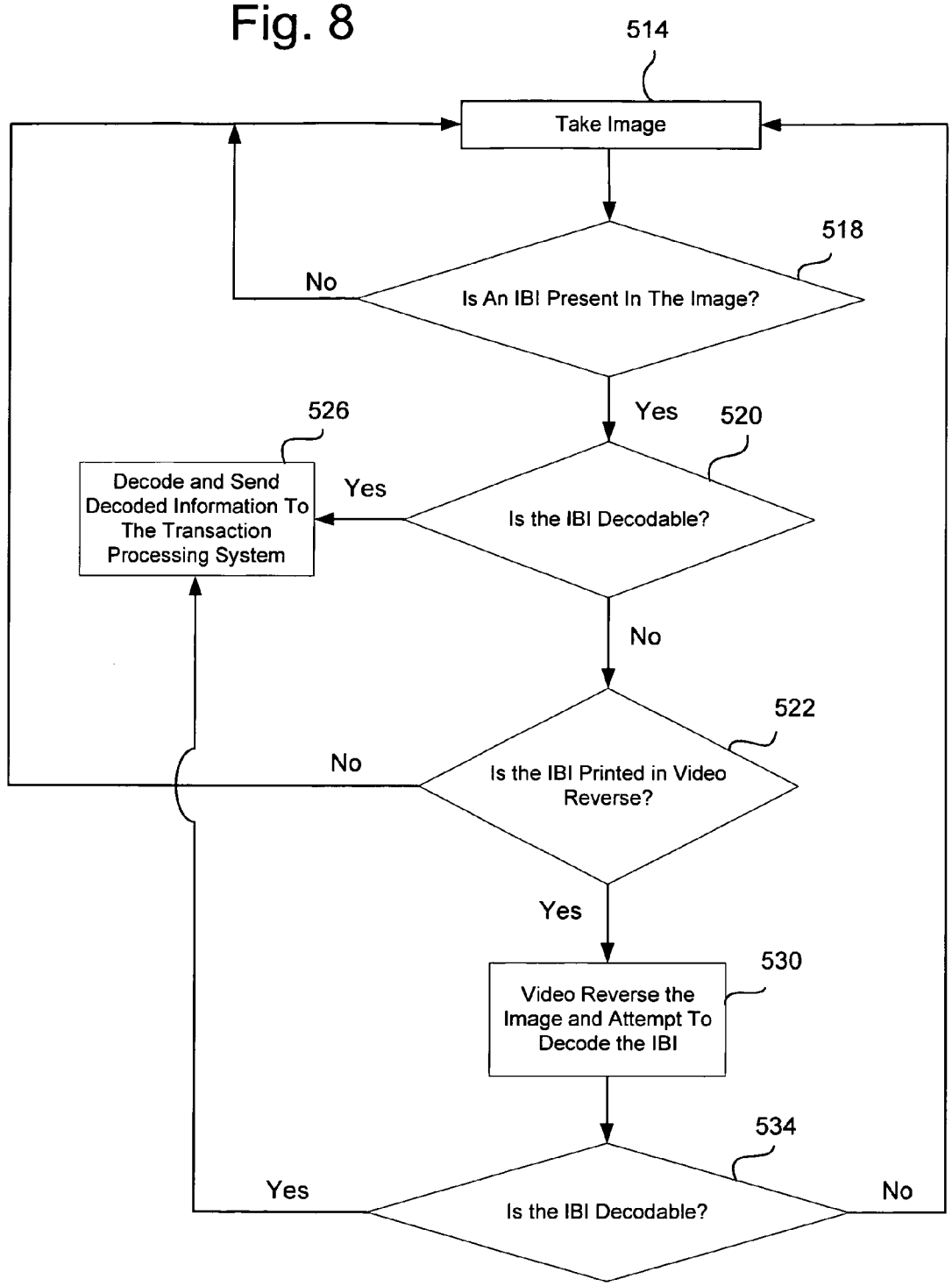

US 8,210,436 B2

AUTOMATIC VIDEO IMAGE REVERSAL OF DIFFICULT TO READ SYMBOLS

FIELD OF THE INVENTION

The present invention relates to optical reading devices, and more particularly to an optical reading device having a two dimensional imager.

BACKGROUND

Indicia reading devices (also referred to as scanners, image reader, readers, etc.) typically read data represented by printed indicia, (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Optical indicia reading devices typically utilize visible light. Laser indicia reading devices typically utilize transmitted laser light.

One-dimensional (1D) optical bar code readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a remote computer.

Some data collection devices, such as hand-held image readers, are capable of capturing images as well as reading barcodes. The reading and decoding of a barcode represents an operation distinct from that involved in capturing an image. The reading and decoding of a bar code involves the imaging and then decoding of a one or two dimensional graphic symbol into the alphanumeric, full ASCII or other data sequence encoded by the symbol. The capturing of an image involves storing an electronic visual copy/representation of the image.

Efforts regarding such systems have led to continuing developments to improve their versatility, practicality and efficiency.

BRIEF DESCRIPTION OF THE DRAWINGS

FIG. 7 is an exemplary flowchart for operating an indicia reader.

FIG. 8 is an exemplary flowchart for operating an indicia reader.

DETAILED DESCRIPTION

The invention features a system and method for automatically discriminating between different types of data with an image reader. A human operator may aim a hand-held image reader at a target containing a form, information bearing indicia (IBI) or dataform, text, or other element and actuate a trigger on an image reader. An IBI or dataform may be an originally machine generated symbology that is also machine readable, such as a 1-D barcode, a 2-D barcode, a 1-D stacked barcode, a logo, glyphs, color-codes, and the like.

When using an embodiment of an image reader, a human operator may intuitively point the reader directly at the data to be collected, regardless of its type, and actuate a trigger.

Figure 1:
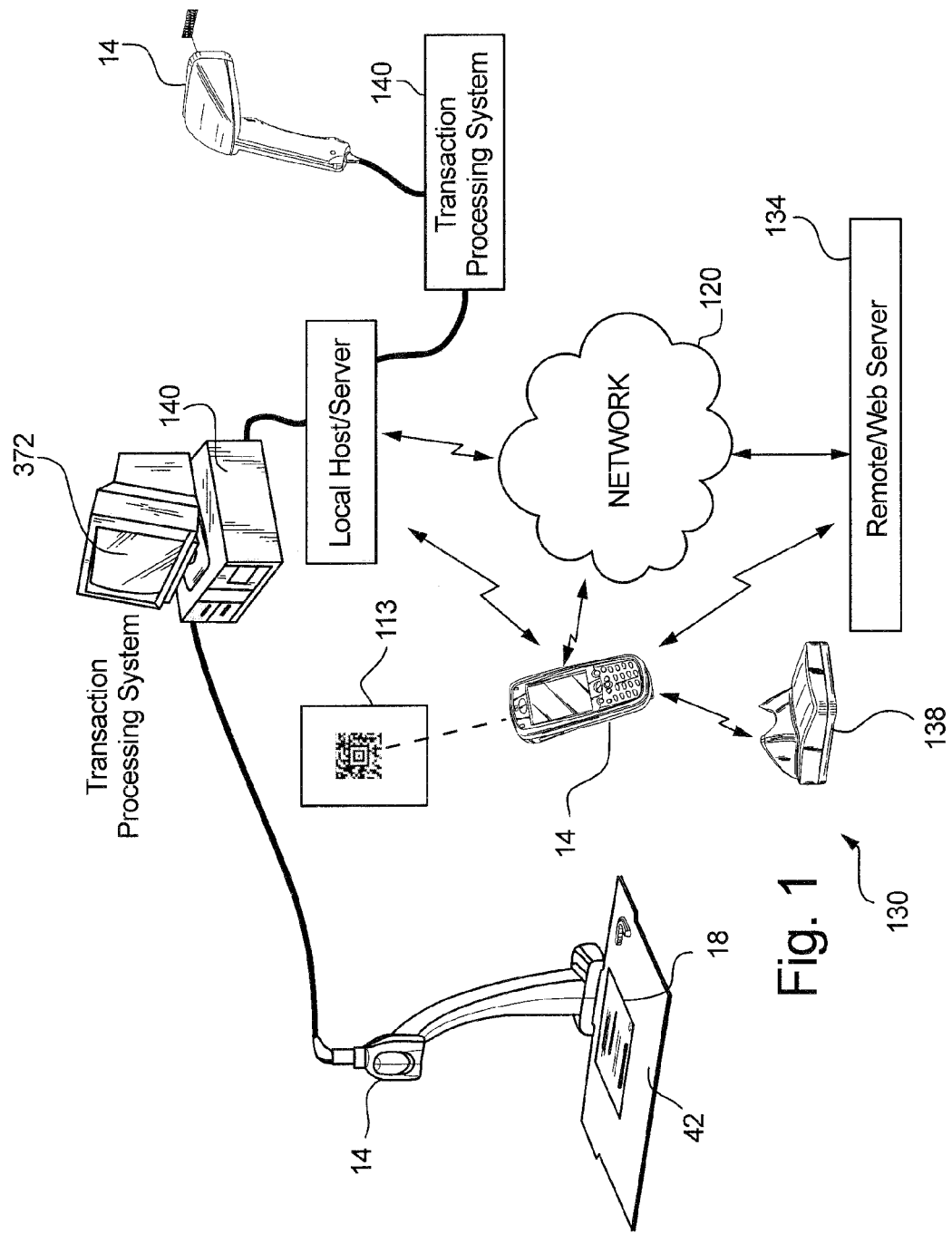
FIG. 1 is a block diagram of an exemplary image reader system.

FIG. 1 illustrates a scanning system configuration in accordance with the present invention, wherein a plurality of image readers 14 are being operated or utilized in a facility, such as a retail store. An exemplary image reader has an image sensor which digitizes a representative image seen in an imaging field of view. The image readers may be in communication (wired or wireless) to a local transaction processing system 140, such as a cash register, customer station or employee station. The transaction processing systems 140 may be in communication (wired or wireless) with a local server 24.

Figure 2:
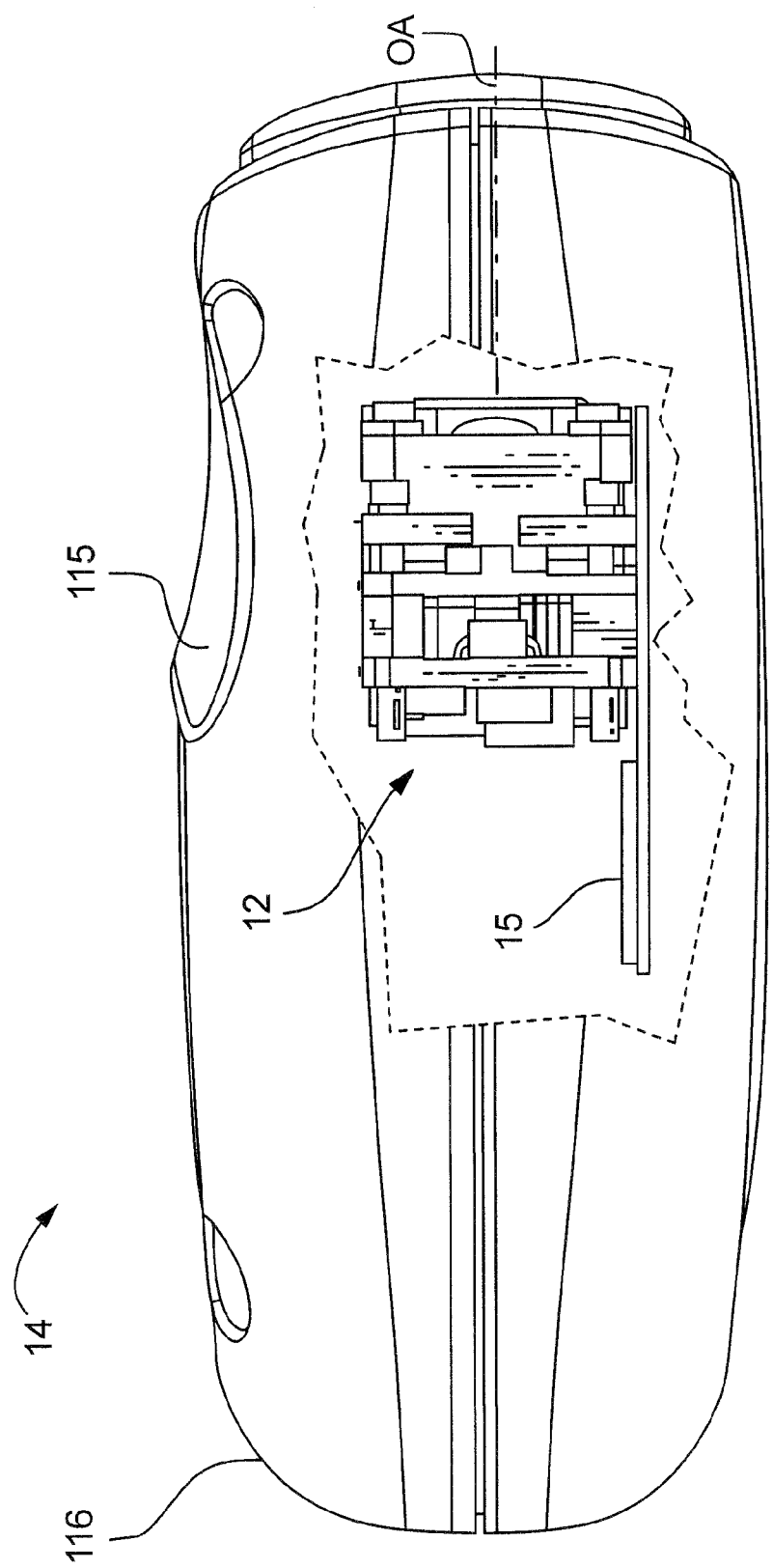
FIG. 2 is a fragmentary partially cutaway side view of an exemplary image reader.
Figure 3:
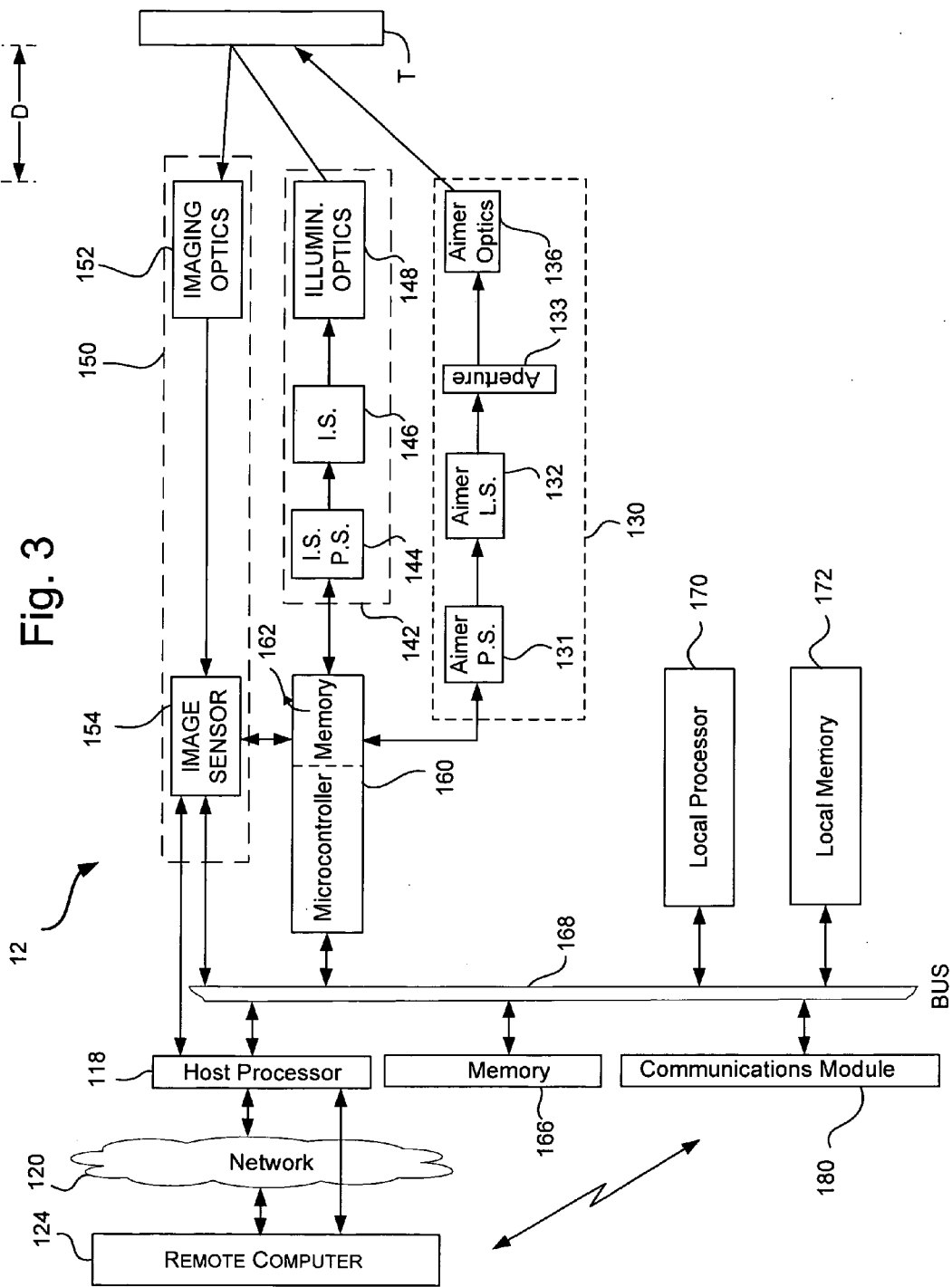
FIG. 3 is a block schematic diagram of an exemplary imaging module.

Referring to FIGS. 2 and 3, an optical indicia reader 14 may have a number of subsystems for capturing and reading images, some of which may have symbol indicia provided therein. Reader 14 may have an imaging reader assembly 12 provided within a head portion or housing 116 which may be configured to be hand held by an operator. A trigger 115 may be used to control operation of the reader 14. Image reader assembly 12 has imaging receive optics 152 having an optical axis (OA) for receiving light reflected from a target T and directing or projecting the reflected light from the target T to an image sensor 154. The optical axis is a line of symmetry through the imaging optics.

The receive optics 152 has a focal point wherein parallel rays of light coming from infinity converge at the focal point. If the focal point is coincident with the image sensor, the target (at infinity) is "in focus". A target T is said to be in focus if light from target points are converged about as well as desirable at the image sensor. Conversely, it is out of focus if light is not well converged. "Focusing" is the procedure of adjusting the distance between the receive optics and the image sensor to cause the target T to be approximately in focus.

The target may be any object or substrate and may bear a 1D or 2D bar code symbol or text or other machine readable indicia. A trigger 115 may be used for controlling full or partial operation of the reader 14.

Image sensor 154 may be a two-dimensional array of pixels adapted to operate in a global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed. An exemplary CMOS sensor is model number MT9V022 from Micron Technology Inc. or model number VC5602V03636CLCC from STMicroelectronics.

In a full frame (or global) shutter operating mode, the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

Features and advantages associated with incorporating a color image sensor in an imaging device, and other control features which may be incorporated in a control circuit are discussed in greater detail in U.S. Pat. No. 6,832,725 entitled "An Optical Reader Having a Color Imager" incorporated herein by reference. It is to be noted that the image sensor 154 may read images with illumination from a source other than illumination source 146, such as by illumination from a source located remote from the reader.

The output of the image sensor may be processed utilizing one or more functions or algorithms to condition the signal appropriately for use in further processing downstream, including being digitized to provide a digitized image of target T. Digitizing or digitization may be representing an object, an image, or a signal (usually an analog signal) by a discrete set of its points or samples. The result is called "digital representation" or, more specifically, a "digital image", for the object, and "digital form", for the signal. Digitization may be performed by reading an analog signal A, and, at regular time intervals (sampling frequency), representing the value of A at that point by an integer. Each such reading is called a sample.

A microcontroller 160 may perform a number of processing functions and be located on board with other components, such as the image sensor. The particulars of the functionality of microcontroller 160 may be determined by or based upon certain configuration settings or data which may be stored in remote or local memory 162, 166, 172. One such function may be controlling the amount of illumination provided by illumination source 146 by controlling the output power provided by illumination source power supply 144. Microcontroller 160 may also control other functions and devices.

An exemplary microcontroller 160 is a CY8C24223A made by Cypress Semiconductor Corporation, which is a mixed-signal array with on-chip controller devices designed to replace multiple traditional MCU-based system components with one single-chip programmable device. It may include configurable blocks of analog and digital logic, as well as programmable interconnects.

Microcontroller 160 may include a predetermined amount of memory 162 for storing firmware and data. The firmware may be a software program or set of instructions embedded in or programmed on the microcontroller which provides the necessary instructions for how the microcontroller operates and communicates with other hardware. The firmware may be stored in the flash memory (ROM) of the microcontroller as a binary image file and may be erased and rewritten. The firmware may be considered "semi-permanent" since it remains the same unless it is updated. This firmware update or load may be handled by a device driver.

The components in reader 14 may be connected by one or more bus 168, data lines or other signal or data communication form. Exemplary forms may be an Inter-IC bus such as a two wire interface (TWI), dedicated data bus, RS232 interface, USB, etc.

A TWI bus is a control bus that provides a communications link between integrated circuits in a system. This bus may connect to a host computer in relatively close proximity, on or off the same printed circuit board as used by the imaging device. TWI is a two-wire serial bus with a software-defined protocol and may be used to link such diverse components as the image sensor 154, temperature sensors, voltage level translators, EEPROMs, general-purpose I/O, A/D and D/A converters, CODECs, and microprocessors/microcontrollers.

A host processor 118 or a local processor 170 may be utilized to perform a number of functional operation, which may involve the performance of a number of related steps, the particulars of which may be determined by or based upon certain configuration settings stored in memory 166 which may be any one of a number of memory types such as RAM, ROM, EEPROM, etc. In addition some memory functions may be stored in memory 162 provided as part of the microcontroller 160. An exemplary processor may be a ST Microelectronics product number SC32F103 or MagnaChip Semiconductor product number MC521 EA.

An exemplary function of a processor 118, 170 may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies. UPC/EAN bar codes are standardly used to mark retail products throughout North America, Europe and several other countries throughout the worlds. Decoding is a term used to describe the interpretation of a machine readable code contained in an image projected on the image sensor 154. The code has data or information encoded therein. Information respecting various reference decode algorithm is available from various published standards, such as by the International Standards Organization ("ISO").

An exemplary function of host processor 118, 170 may be to manipulate images, such as cropping or rotation such as described herein.

Imaging reader assembly 12 may also have an aiming generator light source 132, aiming aperture 133, aiming optics 136, an illumination source(s) 146 and illumination optics 148.

Illumination and aiming light sources with different colors may be employed. For example, in one such embodiment the image reader may include white and red LEDs, red and green LEDs, white, red, and green LEDs, or some other combination chosen in response to, for example, the color of the symbols most commonly imaged by the image reader. Different colored LEDs may be each alternatively pulsed at a level in accordance with an overall power budget.

Aiming pattern generator 130 may include a power supply 131, light source 132, aperture 133 and optics 136 to create an aiming light pattern projected on or near the target which spans a portion of the receive optical system 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

Generally, the aiming light source may comprise any light source which is sufficiently small or concise and bright to provide a desired illumination pattern at the target. For example, light source 132 for aiming generator 130 may comprise one or more LEDs, such as part number NSPG300A made by Nichia Corporation.

The light beam from the LEDs 132 may be directed towards an aperture 133 located in close proximity to the LEDs. An image of this back illuminated aperture 133 may then be projected out towards the target location with a lens 136. Lens 136 may be a spherically symmetric lens, an aspheric lens, a cylindrical lens or an anamorphic lens with two different radii of curvature on their orthogonal lens axis. Alternately, the aimer pattern generator may be a laser pattern generator.

The light sources 132 may also be comprised of one or more laser diodes such as those available from Rohm. In this case a laser collimation lens (not shown in these drawings) will focus the laser light to a spot generally forward of the scanning hear and approximately at the plane of the target T. This beam may then be imaged through a diffractive interference pattern generating element, such as a holographic element fabricated with the desired pattern in mind.

Image reader may include an illumination assembly 142 for illuminating target area T. Illumination assembly 142 may also include one or more power supplies 144, illumination sources 146 and illumination optics 148.

A communications module 180 provides a communication link from imaging reader 14 to other imaging readers or to other systems such as a server/remote processor 124.

The processor, memory and associated circuitry which performs or controls the exemplary image manipulations (e.g. image cropping function) described hereinbefore may be provided in the image reader assembly 12 or on associated circuit boards 15 which are located within the housing 116 of the image reader 14. Existing labels encode information in a variety of formats and are commonly employed in applications such as inventory control systems and, most familiarly, affixed to consumer goods for retail store check-out, among others. Typically, the information encoded on each label uniquely identifies the product or product line. Such information, once decoded, can be used to identify other information, e.g., price, associated with the labeled object.

An exemplary optical image reading or scanning system may use various apparatus and methods for the purpose of reading such labels, identifying the particular label format, and decoding the information stored in the label. In the case of bar code scanners, for example, a typical system has one or more light sources, such as a laser or laser diode, which are used to scan the label. Labels may be composed of a series of parallel dark and light areas, e.g., bars and spaces. A collection subsystem detects at least a portion of the light reflected from the label, distinguishes between dark and light areas, and converts the optical information into an electrical signal that can be recognized by a computer or other electronic system.

Labels, e.g., bar codes or other such symbols may include characters (which can, e.g., be alphanumeric) defined by a number of elements, e.g., bars and spaces. For any given symbology, individual characters within a label are comprised of a given number of elements, and the width of each of these elements is expected to be within a known range, thus allowing the character to be reliably decoded. Exemplary of this is the Universal Product Code (UPC) label in which each character is made up of two bars and two interleaved spaces. The width of each character is measured in units called "modules" with each character being seven modules in width. The width of any particular bar or space within the character representation is between one and four modules. The character value depends on the relative width in modules of the two bars and two spaces it comprises. For example, indicating bars with a 1 and spaces with a 0, a sequence of 111 would represent a bar that is three modules in width.

If one or more of the above characteristics or other characteristics of other types of codes is violated (i.e., number of elements per character and/or width of elements in known range), typically the character in question will be considered to be undecodable and the entire scan of data may be discarded. Factors that may cause this include: if an individual element has been split into multiple pieces; multiple elements have been merged into a single piece; or, if the width of an element has been distorted beyond specified boundaries; poor printing used for creating the label; specular reflection; etc. In these instances, some existing systems may require a new scan leading to discarding the entire scan as unusable even though only one character may be affected by the degradation.

Some codes may use parity formats to form alternative representations for the digits 0 through 9. These alternate formats may be utilized in different locations on a label thus providing means for verifying accuracy of data. For example, UPC labels, with the exception of UPC-E labels, are comprised of right and left segment halves. Characters in the left segment are of odd parity and, when scanned from left to right, all begin with spaces. Characters in the right segment are of even parity and, when scanned from left to right, all begin with bars. Thus, the character value 5 may be represented as 0110001 using odd parity or 1001110 using even parity. Likewise, the character 3 may be represented as 0111101 using odd parity or 1000010 using even parity.

Additionally, labels may utilize feature characters, such as center or guard characters, as delimiters or to separate segments of the label. Most UPC labels, as noted above, have left and right segment halves. These segment halves are separated by a center band character that typically comprises two single module bars and three interleaved single module spaces. The beginning and end of the label are delimited by a pair of guard characters, each of which typically comprises two single module bars and one interleaved, single module space. The bar/space representations of these feature characters are unique from that of data characters to enhance detection and decoding capability. Furthermore, an unprinted margin area or white space is typically located outwardly of the two guard characters.

In addition to the UPC formats, a variety of other label formats may exist which vary, among other ways, in structure, content, parity requirements, and type of feature characters. Code 39 and Code 128, for example, are both non-segmented label formats, i.e., they have no center feature characters separating two or more segments of bars. Other label encoding schemes have been developed which have differing pattern structures for the dark and light areas. Exemplary of these latter code types are the stacked bar code formats referred to as Code 49 and PDF 417. Recovering information from optical code labels may pose many difficulties that must be overcome by an indicia reader. For example, in order to read a label completely, i.e., from left guard character or margin to right guard character or margin in a single optical pass, the label must be properly oriented with respect to the scanning beam. Failure to read in a single pass, e.g., when a label is misframed or read diagonally across a top or bottom border, results in the reading of incomplete or degraded character data and yields partial scans of the label which must be assembled properly in order to formulate valid label information, otherwise the object must be repositioned and rescanned until a successful read is obtained. In such cases, data on either end of an input string may be inaccurately read, yet may appear to be an otherwise structurally valid character.

Even when a single optical pass traverses an entire label from left to right, problems in decoding the label may occur, for example, when the label is folded, split, torn or similarly damaged, thus making it difficult to recover label information. Likewise, differences in package configurations, label sizes and locations, and scanner positions, among other factors, may affect a read. As a result, partially read labels may be more likely to occur and more difficult to decipher. In many applications, such as store check-out stands, this translates to a need for high operator concentration and dexterity yet results in non-optimum speed or efficiency, since the operator must take care to ensure that the object to be scanned is properly positioned (or must reposition and rescan repeatedly for a valid reading). As well, the multitude of optical code formats currently in use may require differing methodologies to be used in order to realize ideal (i.e., optimum speed and efficiency) decoding. In settings where multiple formats may be encountered by the same operator, additional effort and skill may be required to ensure that the system is set for the ideal decoding methodology to be utilized for a particular symbology.

Another exemplary factor which may affect a successful code read is a configuration wherein a code is created utilizing white ink on clear plastic bags, such as may be found with medical intravenous drug (I-V) bags.

Figure 4:
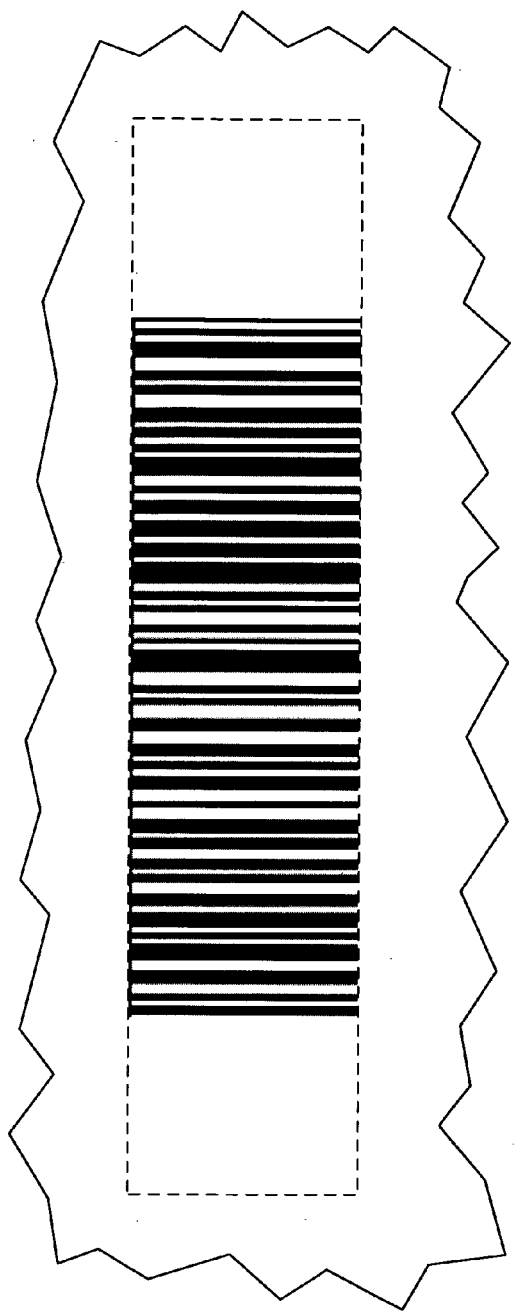
FIG. 4 is an illustration of an exemplary information bearing indicia.

Referring to FIG. 4, an exemplary configuration is presented wherein white ink print may be utilized as the spaces in a bar code, and the clear plastic of a bag may be the bars under lighting conditions with no back lighting. In this lighting example, the white printing is the space part of the bar code, and the thick white blocks represent "quiet zones".

Figure 5:
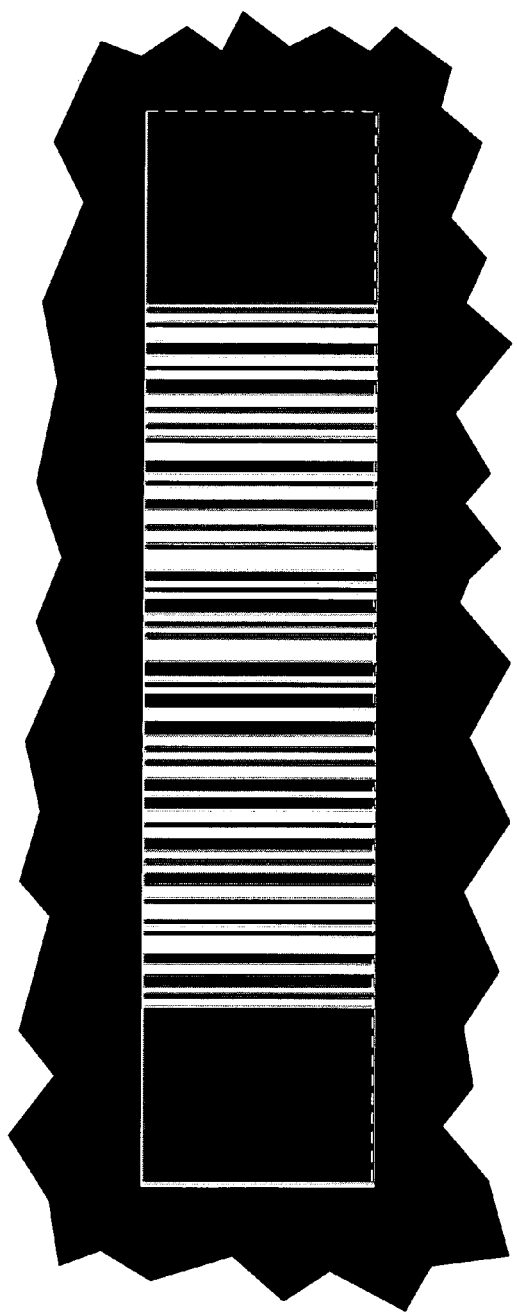
FIG. 5 is an illustration of an exemplary information bearing indicia.

Referring to FIG. 5, an exemplary configuration is presented wherein the lighting illustrated in FIG. 4 is changed to bright backlighting, for example if an I-V bag is hanging in front of a window with bright sunlight, the sense of the bars and spaces is reversed. In FIG. 5, the white print is seen by an image reader as black bars, and the clear is seen as space. Under this condition, a false read or a no read will occur. In order to obtain a good decode, the video image may have to be reversed. An exemplary embodiment for rendering the IBI in the image of FIG. 5 decodable is to change the video sense using the image sensor's video reverse command so that the image (or video) is reversed. This may be done manually or automatically. Video reversal may be defined as inverting, reversing or flipping the pixels values so that, for example in binary images, pixel values of 1 are changed to 0 and pixel values of 0 are changed to 1.

An image may be reversed automatically after a predetermined number of failed attempts to read normally (without reverse video). The exact details and number of failed attempts to trigger the reversal may be determined by an operator implementing the mechanism. The image reader may retain current video sense status and only toggle as needed for subsequent failed attempts.

In exemplary embodiments, the video reverse function may be symbology specific. Specific symbologies may always be printed video reverse. Symbols may be sensed if a bar code symbol is printed video reverse and the indicia reader may automatically switch to a video reverse decode algorithm. An indicia reader may be capable of reading video reverse codes with the video reverse option disabled. An indicia reader may be possible to detect the finder pattern, and measure if that pattern is relatively light compared to the background/quit zone. When such situation is identified we can momentarily switch to a video reverse algorithm, decode and fall back to normal decoding.

Figure 6:
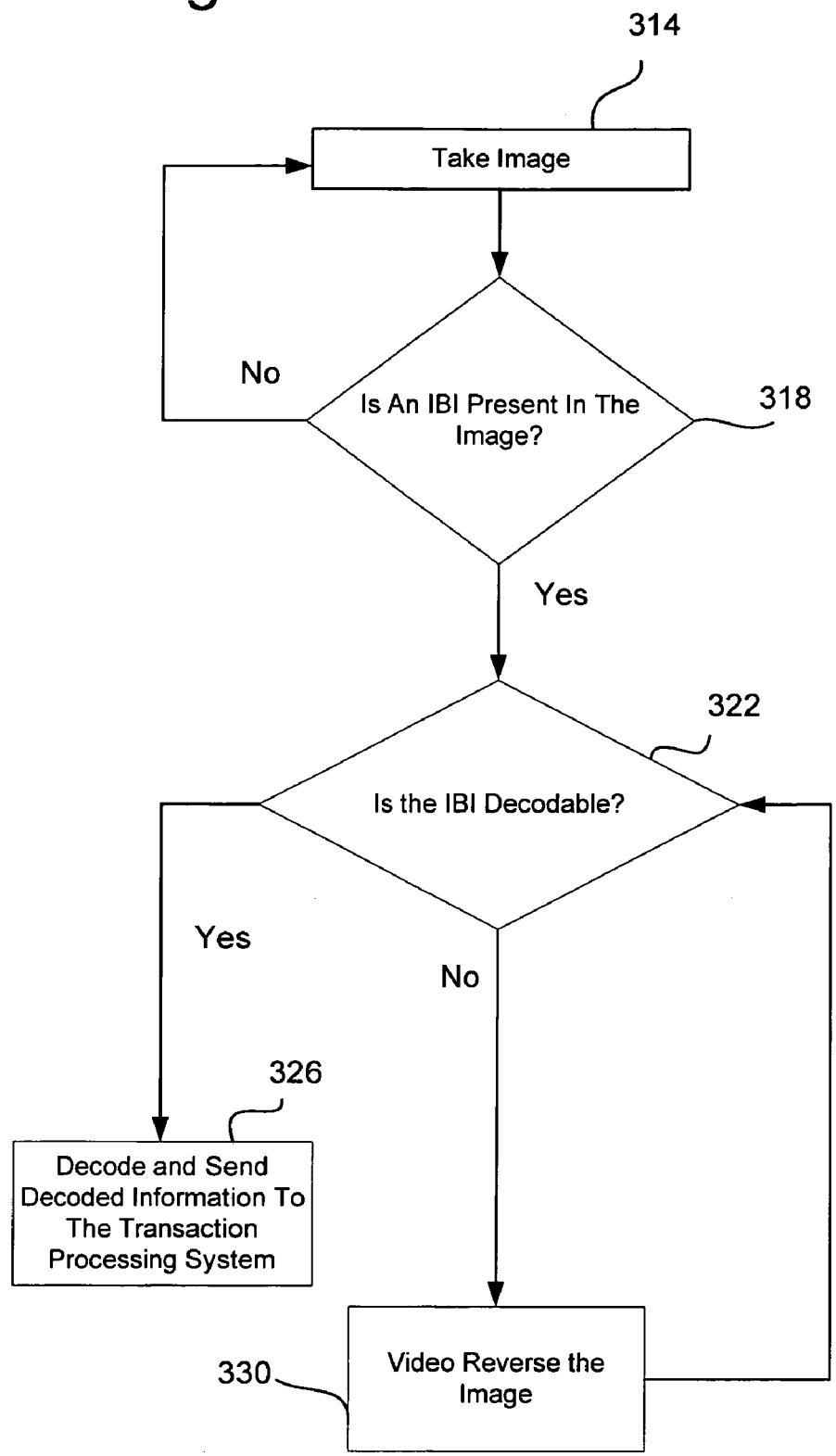
FIG. 6 is an exemplary flowchart for operating an indicia reader.

An establishment may want to be made aware of instances when a code is not read or decoded. FIG. 6 is an exemplary flowchart for reporting such instances, in which an image is taken of an image in a step 314. A query is made in a step 318 to determine if an IBI is present in the image. If no, then another image is taken. If yes, then a query is made in a step 322 whether the IBI can be decoded. If yes, the IBI is decoded and the decoded information is sent to a transaction processing system or a host device or system in a step 326 to be utilized by the establishment. If the IBI cannot be or is not decoded, an image of the IBI is sent to the transaction processing system or host device or system in a step 330. The establishment may use this image for information tracking or processing, such as to use as evidence for quality or refund feedback information for the supplier of the IBI. There are many uses for the undecoded IBI images, such as they may be for user feedback for, example, operators that have unsatisfactorily high undecoded scanning attempts.

FIG. 7 is an exemplary flowchart for reporting undecoded IBIs, in which a counter is set to zero in a step 414. An event, such as an operator trigger pull, processor command or other image initiation event occurs in a step 418. The counter is incremented in a step 422. An image of a target is taken in a step 426. A query is made in a step 430 to determine if an IBI is present in the image. If no, then the event counter is set to zero and another image is taken. If yes, then a query is made in a step 434 whether the IBI can be decoded or is decodable. If yes, the IBI is decoded and the decoded information is sent to a transaction processing system or a host device or system in a step 438 to be utilized by the establishment. If the IBI cannot be or is not decoded, a query is made in a step 442 whether the counter has reached a predetermined number. If no, the counter is incremented and another image is taken. If the counter number is reached, the image of the IBI is sent to the transaction processing system or host device or system in a step 446. The establishment may use this image for information tracking or processing, such as to use as evidence for quality or refund feedback information for the supplier of the IBI. There are many uses for the undecoded IBI images, such as they may be used for user feedback for, example, operators that have unsatisfactorily high undecoded scanning attempts.

FIG. 8 is an exemplary flowchart for reporting such instances, in which an image is taken of an image in a step 514. A query is made in a step 518 to determine if an IBI is present in the image. If no, then another image is taken. If yes, then a query is made in a step 520 whether the IBI can be decoded. If yes, the IBI is decoded and the decoded information is sent to a transaction processing system or a host device or system in a step 526 to be utilized by the establishment. If the IBI cannot be or is not decoded, a query is made in a step 522 whether the IBI is printed in video reverse. It the answer is no, then another image is taken in step 514. If yes, the IBI is decoded and the decoded information is sent to the transaction processing system or host device or system in step 526 to be utilized by the establishment. If the IBI cannot be or is not decoded, another image is taken in step 514.

What is disclosed is an exemplary method of operating a bar code scanning system adapted for assembling information bearing indicia (IBI) information from partial scans of IBI data which may comprise some undecodable characters, the method comprising the steps of: converting light reflected from a target into output signals representative thereof utilizing an image sensor; illuminating the target utilizing an illumination source; directing light from the target to the image sensor array utilizing receive optics; determining if information contained in IBI within the target derived from the output signals is not decodable; transmitting an image of the IBI to a host processor if the IBI is not decoded.

In an exemplary system, the system displays the IBI on a host device, or the IBI is and decodable IBI information are transmitted together. The IBI may be stored in a host device for further processing, or sent to a third party supplier for evaluation, refund, etc. The transmitting step may occur only after a predetermined number of failed decode attempts. The transmission of the IBI may only occur when an IBI cannot be or is not decoded.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. A method of operating an image reading system adapted for processing information bearing indicia (IBI) comprising the steps of:
   converting light from a target into output signals representative thereof utilizing an image sensor array;
   directing light from the target to the image sensor array utilizing receive optics;
   determining if information contained in an IBI within the target derived from the output signals is not decodable;
   detecting a finder pattern and measuring if the finder pattern is relatively light compared to a background zone;
   reversing the image of the IBI by inverting the pixels values of the IBI image if the finder pattern is relatively light compared to the background zone; and,
   decoding the reversed image.

2. A method according to claim 1, wherein the reversing is performed automatically if the IBI is not decodable.

3. A method according to claim 1, wherein the reversing step occurs only after a predetermined number of determining step attempts.

4. A method according to claim 1, further comprising storing the IBI image for further processing.

5. A bar code scanning system adapted for processing information bearing indicia (IBI) comprising:
   an image sensor array for converting light from a target into output signals representative thereof;
   receive optics for directing light from the target to the image sensor array; and,
   a processor for:
      determining if information contained in an IBI within the target derived from the output signals is not decodable;
      reversing the image of the IBI by inverting the pixels values of the IBI image wherein the IBI is created utilizing white ink on clear plastic wherein white ink is utilized as spaces in a bar code, and the clear plastic is utilized as bars; and,
      decoding the reversed image.

6. A bar code scanning system according to claim 5, wherein the reversing is performed automatically if the IBI is not decodable.

7. A bar code scanning system according to claim 5, wherein the reversing occurs only after a predetermined number of undecodable attempts.

8. A bar code scanning system according to claim 5, further comprising memory for storing the IBI image for further processing.

9. A method of operating an image reading system adapted for processing information bearing indicia (IBI) comprising the steps of:
   converting light from a target into output signals representative thereof utilizing an image sensor array;
   directing light from the target to the image sensor array utilizing receive optics;
   wherein the IBI is created utilizing white ink on clear plastic wherein white ink is utilized as spaces in a bar code, and the clear plastic is utilized as bars; and,
   determining whether information contained in an IBI within the target derived from the output signals is decodable or not;
   reversing the image if the IBI is not decodable by inverting the pixels values of the IBI image; and,
   determining whether information contained in the reversed IBI within the target derived from the output signals is decodable or not; and
   decoding the reversed image if the IBI is decodable.

10. A method according to claim 9, wherein the reversing is performed automatically if the IBI is not decodable.

11. A method according to claim 9, wherein the reversing step occurs only after a predetermined number of determining step attempts.

12. A method according to claim 9, further comprising storing the IBI image for further processing.

13. A bar code scanning system adapted for processing information bearing indicia (IBI) comprising:
   an image sensor array for converting light from a target into output signals representative thereof;

receive optics for directing light from the target to the image sensor array; and, a processor for:
   determining whether information contained in an IBI within the target derived from the output signals is decodable or not;
   querying whether the IBI is printed in video reverse and if so,
   reversing the image if the IBI is not decodable by inverting the pixels values of the IBI image; and,
   determining whether information contained in the reversed IBI within the target derived from the output signals is decodable or not; and
   decoding the reversed image if the IBI is decodable.

14. A bar code scanning system according to claim 13, wherein the reversing is performed automatically if the IBI is not decodable.

15. A bar code scanning system according to claim 13, wherein the reversing occurs only after a predetermined number of undecodable attempts.

16. A bar code scanning system according to claim 13, further comprising memory for storing the IBI image for further processing.

* * * * *